Patented Dec. 9, 1924.

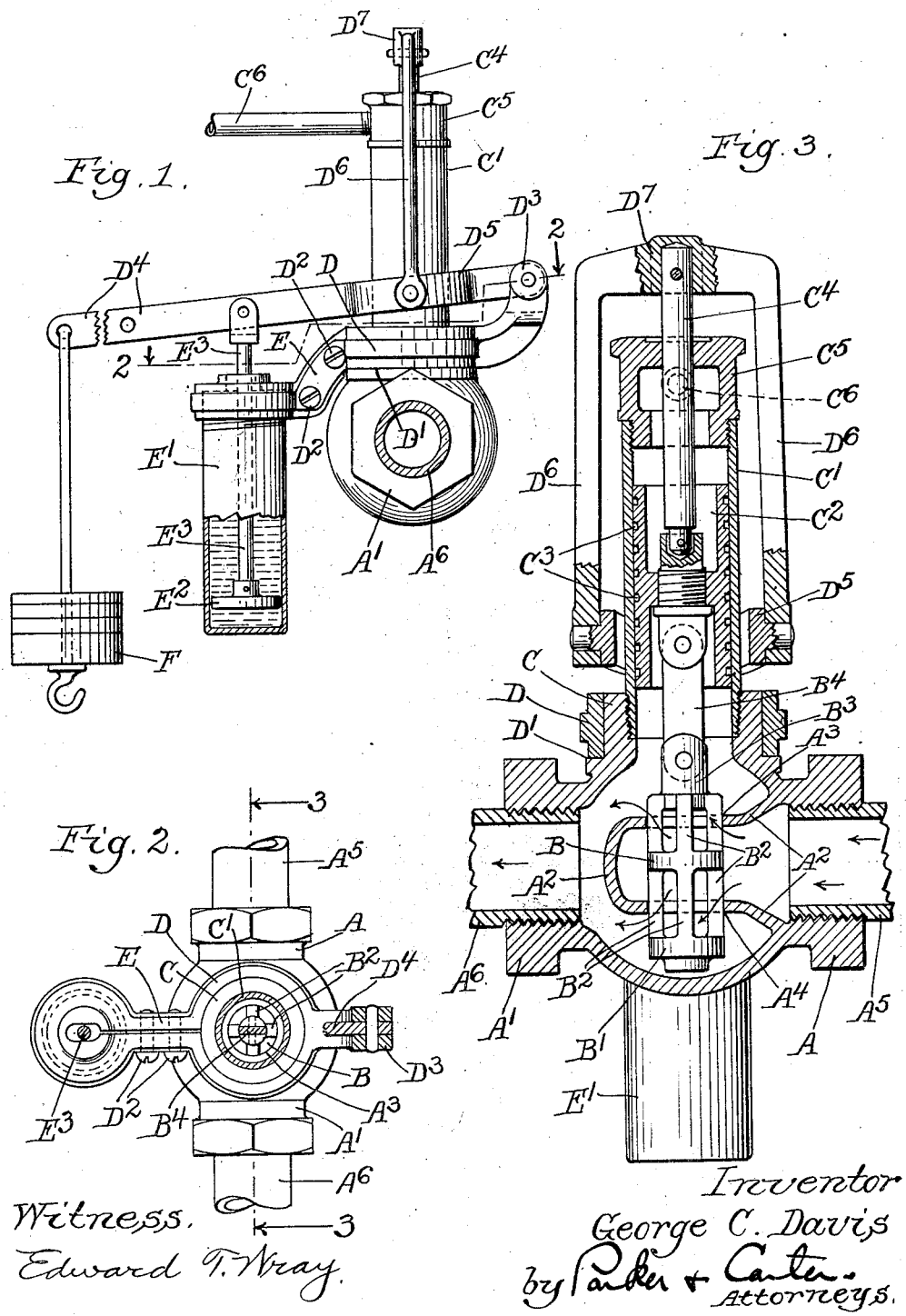

1,518,776

UNITED STATES PATENT OFFICE.

GEORGE C. DAVIS, OF CHICAGO, ILLINOIS, ASSIGNOR TO G. M. DAVIS REGULATOR COMPANY, OF CHICAGO, ILLINOIS, A CORPORATION OF ILLINOIS.

CONTROL FOR REGULATING VALVES.

Application filed October 28, 1922. Serial No. 597,451.

*To all whom it may concern:*

Be it known that I, GEORGE C. DAVIS, a citizen of the United States, residing at Chicago, in the county of Cook and State of Illinois, have invented a certain new and useful Improvement in Controls for Regulating Valves, of which the following is a specification.

My invention relates to pressure regulator valves wherein a weighted lever and a dash pot arranged alongside the valve housing are associated with a pipe line. It has for one object to provide an arrangement whereby the position of the weighted lever and dash pot may be controlled subject to the will of the operator for convenience in installing the valve. Among the objects of my invention therefore is to provide a supporting and valve controlling apparatus adapted to project laterally from the valve and so arranged that its relation with respect to the pipe line may be adjusted and controlled by varying the inclination of the weighted lever and the position of the weight and dash pot with respect to the pipe line. Other objects will appear from time to time throughout the specification.

My invention is illustrated more or less diagrammatically, wherein—

Figure 1 is a side elevation;

Figure 2 is a sectional plan view, section being taken along the line 2—2 of Figure 1;

Figure 3 is a section on the line 3—3 of Figure 2.

A is the high pressure or intake side of the valve housing. A' is the low pressure or discharge side of the valve housing. $A^2$, $A^2$ are the several parts of the intermediate double diaphragm separating the high and low pressure chambers and provided with upper and lower seats $A^3$ $A^4$ through which fluid can travel from the high pressure to the low pressure side. $A^5$ is the high pressure pipe line leading to the valve, $A^6$ is the low pressure pipe line leading from the valve.

The valve member is made up of the upper and lower diaphragms B B' adapted to make a smooth sliding fit in the valve seats and joined by vertical members $B^2$ to form a valve cage terminating at its upper end in a slotted lug $B^3$ in which is pivotally mounted a link $B^4$ by which the valve may be manipulated. The arrangement is such that when the diaphragms B B' penetrate within the valve seats $A^3$, $A^4$, the valve is closed. Under such conditions there is a balanced pressure so that the pressure in the high pressure side exerts no tendency toward changing the position of the valve and when the cage slides down to bring the two diaphragms out of line with the valve seats, free passage of the fluid through the seats or ports $A^3$ $A^4$ is permitted.

C is a collar projecting from the valve body and apertured in line with the valve seats as indicated. C' is a cylinder screw threaded in the collar in line with the valve seats. $C^2$ is a piston slidable in the cylinder. This piston is provided with a number of packing grooves $C^3$ which when this apparatus is used on a steam valve fills with water of condensation and makes tight packing and the link $B^4$ is pivoted in the interior of the piston. $C^4$ is a piston rod loosely fitted in the piston but held against longitudinal movement with respect thereto. $C^5$ is the cylinder cap screw threaded in the upper end of the cylinder adapted to close the chamber above the piston and apertured to make a smooth sliding fit with the piston rod. $C^6$ is a pipe screw threaded in the cap $C^5$ adapted to conduct any escaping steam away from the point of escape. This duct may also be used in connection with auxiliary pressure control for the upper side of the piston if that is desired.

D is a split collar rotatably mounted on the collar C and surrounding the piston. This split collar is rested against a shoulder D' at the base of the collar C and adapted to be clamped in position by tightening screws $D^2$. After the collar has been rotated to the desired position, $D^3$ a fulcrum arm projecting from the collar having pivoted thereon a lever $D^4$ which lever has a circular portion $D^5$ to surround the cylinder C'. $D^6$ is a yoke projecting upwardly from the circular portion $D^5$ and terminating in a socket $D^7$ to engage the end of the piston rod $C^4$.

E is a split dash pot arm projecting downwardly from the collar D and carrying a dash pot E' screw threaded therein. The tightening of the screws $D^2$ locks the dash pot against unscrewing the same as it locks the split collar on the fixed collar C. $E^2$ is a plunger slidable in the dash pot, and $E^3$ a plunger rod projecting upwardly through the dash pot cover and pivoted on the lever $D^4$.

E⁴ is an adjustable weight positioned on the lever D⁴, the lever being perforated at a plurality of places for adjustment of the weight F.

The use and operation of my invention are as follows:

The pressure on the high pressure side is likely to vary and it is desired that the pressure on the low pressure side remain constant independent of such variation. Therefore the underside of the piston is arranged so as to be exposed to the pressure of the low pressure or controlled side. This pressure is, of course, more than atmospheric and so if the upper side of the piston is exposed to atmospheric pressure the piston will be raised bringing the two valve diaphragms into engagement with the valve seats and closing the valve, whereupon the pressure would immediately drop off on the low pressure side. The weight on the lever resists this upward movement of the piston and insures that as soon as pressure on the low pressure side drops below the predetermined minimum, the valve will open more or less as the case may be until the pressure is built up again to the desired point. If there are certain variations, as there always will be on the high pressure side and if the requirements in the low pressure side are likely to change as they always do, it will happen that the valve will show a tendency to flutter and pound and therefore to avoid this the dash pot is provided.

This dash pot projects outside of the pipe line or valve. This dash pot and the outwardly projecting lever take up considerable amount of room and in installing my apparatus on pipe lines it frequently happens that there is not any too much room for the dash pot and controlled lever. It is to make it possible to adjust the position of this assembly placing it on either side of the line, and adjust the angle of inclination so as to fit into the structure to the best possible extent that the loose collar and associated parts are provided.

I claim:

1. In combination with a valve housing, a valve controlling element mounted thereon, a supported valve adapted for rotary movement about the axis perpendicular to the axis of the pipe line in which the housing is connected to permit angular adjustment of the controlling element without varying the valve adjustment.

2. In combination with a valve housing of a lever mounted for working operation on the housing, a dash pot associated with the lever at one side of the housing and means for mounting the lever and dash pot for angular adjustment about an axis perpendicular to the axis of the valve housing.

3. In a valve housing, a boss projecting therefrom, a collar mounted for rotation on the boss, the collar being split, a split arm in line with the split in the collar, a split cap terminating therein, a dash pot adapted to engage said cap and means for drawing the split arm together to clamp the collar on the boss and the dash pot in the cap to lock the boss in adjusted angular position with respect to the housing.

4. In a valve housing, a boss projecting therefrom, a collar mounted for rotation on the boss, the collar being split, a split arm in line with the split in the collar, a split cap terminating therein, a dash pot adapted to engage said cap and means for drawing the split arm together to clamp the collar on the boss and the dash pot in the cap to lock the boss in adjusted angular position with respect to the housing, a fulcrum arm projecting from the collar automatically opposed to the split arm, a lever fulcrumed on the arm, a connection between it and the dash pot.

5. In a valve housing, a boss projecting therefrom, a collar mounted for rotation on the boss, the collar being split a split arm in line with the split in the collar, a split cap terminating therein, a dash pot adapted to engage said cap and means for drawing the split arm together to clamp the collar on the boss and the dash pot in the cap to lock the boss in adjusted angular position with respect to the housing, a fulcrum arm projecting from the collar automatically opposed to the split arm, a lever fulcrumed on the arm, a connection between it and the dash pot, a cylinder projecting upwardly from the housing beyond the boss, the lever being offset to surround the cylinder, the valve operating boss contained within the cylinder and a yoke projecting upwardly from the offset lever along the cylinder to engage the operating boss.

6. In combination with a regulator valve and housing therefor of a boss projecting from the housing, a split collar mounted for adjustable rotation thereon, a fulcrum arm projecting from the collar at one side, a split cap at the end of the split arm into which a dash pot is adapted to be fitted and means for clamping parts of the split arm together to lock the collar on the boss and the dash pot in the cap, a lever mounted for rotation on the fulcrum arm extending across the housing in line with the dash pot, a plunger in the dash pot, a plunger rod pivoted on the lever, a working connection from the lever to the regulating valve and a counter balance on the lever beyond the dash pot.

Signed at Chicago, county of Cook and State of Illinois, this 25th day of October, 1922.

GEORGE C. DAVIS.